United States Patent
Kobayashi

(10) Patent No.: US 8,588,301 B2
(45) Date of Patent: Nov. 19, 2013

(54) IMAGE CODING APPARATUS, CONTROL METHOD THEREFOR AND COMPUTER PROGRAM

(75) Inventor: Yukifumi Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 12/818,620

(22) Filed: Jun. 18, 2010

(65) Prior Publication Data

US 2011/0002385 A1 Jan. 6, 2011

(30) Foreign Application Priority Data

Jul. 1, 2009 (JP) ................................. 2009-157317

(51) Int. Cl.
*H04N 11/02* (2006.01)

(52) U.S. Cl.
USPC ................................. 375/240.13; 375/240.24

(58) Field of Classification Search
USPC ........................................ 375/240.01–240.29
See application file for complete search history.

(56) References Cited

U.S. PATENT DOCUMENTS

| | | | | |
|---|---|---|---|---|
| 5,748,242 | A * | 5/1998 | Podilchuk | 348/391.1 |
| 8,036,270 | B2 * | 10/2011 | Zhao et al. | 375/240.15 |
| 2005/0069211 | A1 * | 3/2005 | Lee et al. | 382/239 |
| 2007/0019729 | A1 * | 1/2007 | Nakagomi et al. | 375/240.13 |
| 2009/0097555 | A1 * | 4/2009 | Baillavoine et al. | 375/240.12 |

FOREIGN PATENT DOCUMENTS

JP 2006-094081 4/2006

* cited by examiner

*Primary Examiner* — David Czekaj
*Assistant Examiner* — Leron Beck
(74) *Attorney, Agent, or Firm* — Cowan, Liebowitz & Latman, P.C.

(57) ABSTRACT

An image coding apparatus which divides an input picture into a plurality of macroblocks and performs a prediction encoding for each macroblock, comprising a unit for calculating flatness based on pixel values contained in a macroblock of interest and determining whether the macroblock of interest is a flat macroblock, a unit for storing determination results for each macroblock, a unit for determining, based on the determination results, whether the macroblock of interest determined to be a flat macroblock belongs to a flat area, a unit for selecting one of the inter-prediction mode and the intra-prediction mode as a prediction mode for an encoding process of the macroblock of interest based on determination results and on cost values of the inter-prediction mode and the intra-prediction mode, and a unit for performing predictive coding according to the selected prediction mode.

21 Claims, 9 Drawing Sheets

| Intra4×4LumaPredMode | Name of Intra4×4LumaPredMode |
|---|---|
| 0 | Intra_4×4_Vertical |
| 1 | Intra_4×4_Horizontal |
| 2 | Intra_4×4_DC |
| 3 | Intra_4×4_Diagonal_Down_Left |
| 4 | Intra_4×4_Diagonal_Down_Right |
| 5 | Intra_4×4_Vertical_Right |
| 6 | Intra_4×4_Horizontal_Down |
| 7 | Intra_4×4_Vertical_Left |
| 8 | Intra_4×4_Horizontal_Up |

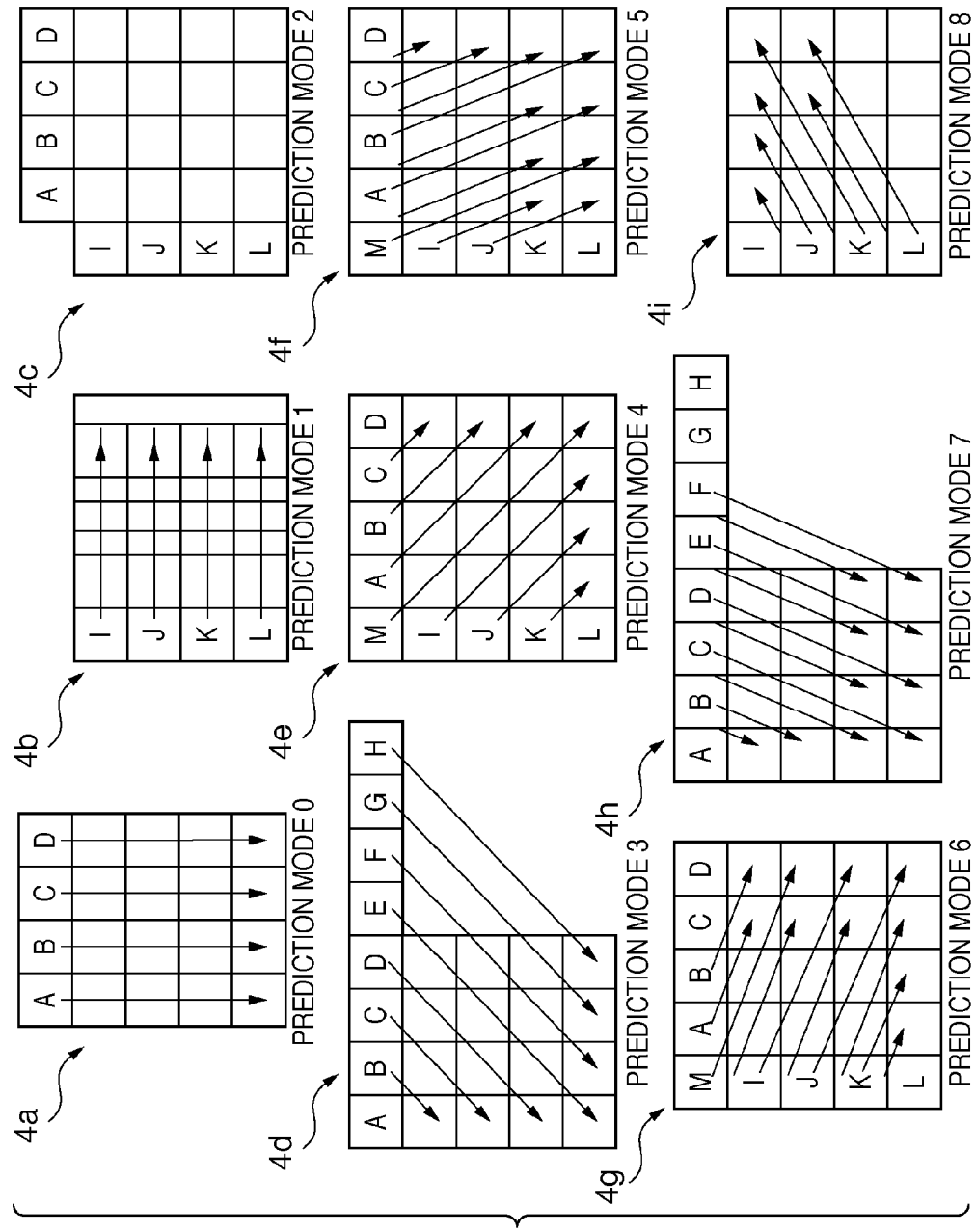
F I G. 4

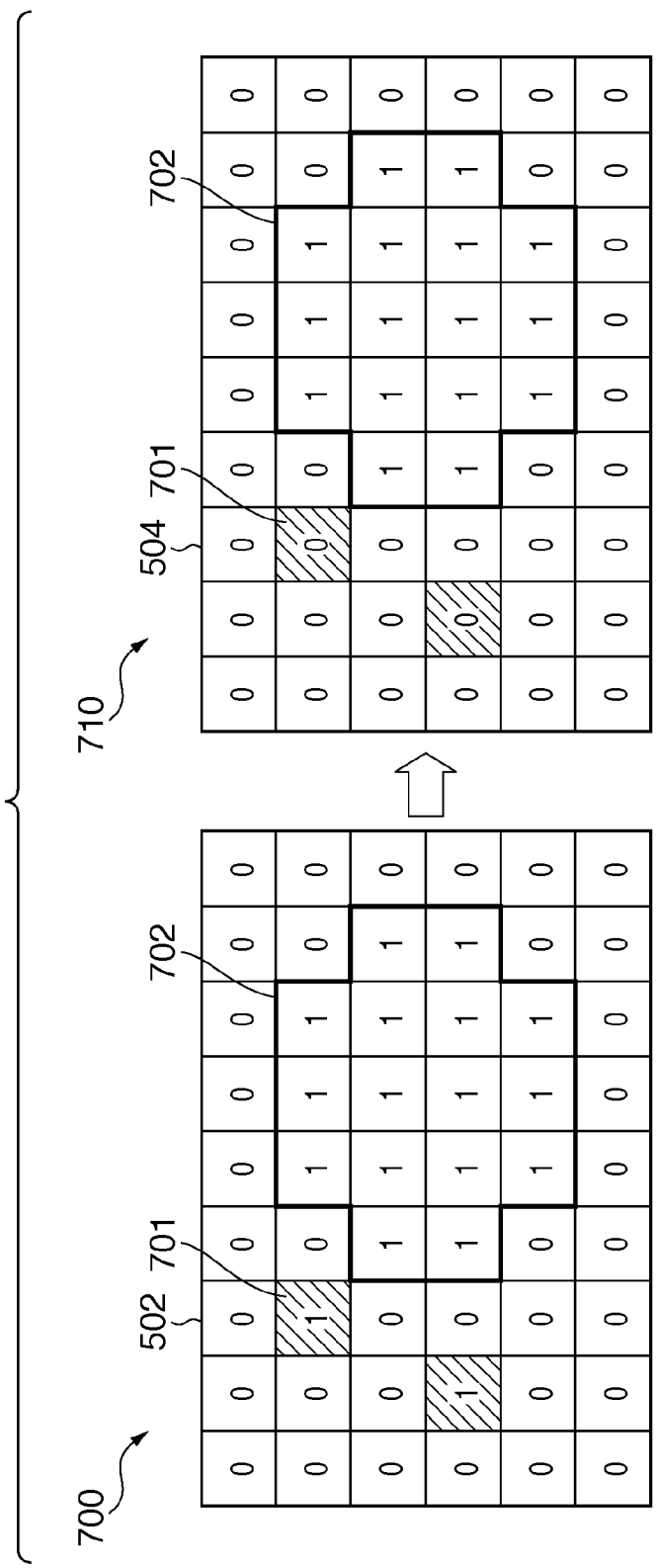

IMAGE CODING APPARATUS, CONTROL METHOD THEREFOR AND COMPUTER PROGRAM

BACKGROUND OF THE INVENTION

1. Field of the Invention

The present invention relates to an image coding apparatus, a control method therefor, and a computer program.

2. Description of the Related Art

In an encoding process of motion pictures, H. 264 encoding allows inter-prediction mode and intra-prediction mode to be selected in inter slices. In the inter-prediction mode, in relation to macroblocks to be encoded, block matching is performed between reference pictures and a current picture, and a position which gives the best coding efficiency is determined to be a motion vector position. To determine the motion vector position, generally a cost function is used, where the cost function is based on differential data obtained by subtraction between the reference picture and the current picture. Various cost functions are conceivable, and a typical example is given by Eq. (1).

$$\text{Cost} = SATD + Qp \times Mvcost \quad (1)$$

where SATD is the sum of absolute Hadamard transform differences calculated using the differential data obtained by subtraction between the reference pictures and current picture, Qp is a quantization parameter used for a quantization process, and Mvcost is a cost value equivalent to a code amount of a motion vector corresponding to length of the motion vector. Using the cost function, a position with the smallest cost value is determined to be the motion vector position. The differential data is generated through subtraction between the reference picture at the motion vector position thus determined and the current picture. The differential data is subjected to orthogonal transform, quantization, and variable-length coding processes to perform encoding in inter prediction mode.

On the other hand, in the intra-prediction mode, pixels around the macroblock to be encoded are used as reference pictures. Pixels used as reference pictures in the intra-prediction mode are shown in FIG. 2. Intra-prediction modes include intra 4×4 prediction, intra 8×8 prediction, and intra 16×16 prediction modes, each of which supports multiple prediction modes such as vertical prediction mode, horizontal prediction mode, and DC prediction mode. The intra 4×4 prediction mode will be described as an example here. Pixels A to M around pixels a to p in the 4×4 block to be encoded are used as pixels of reference pictures. Pixels A to D are four adjacent pixels just above the 4×4 block to be encoded. Pixels E to H are four successive pixels extending to the right of pixel D. Pixels I to L are four adjacent pixels to the immediate left of the 4×4 block to be encoded. Pixel M is located above pixel I. The surrounding pixels A to M are pixels of a locally decoded picture after encoding rather than pixels of an original picture.

The way in which reference pictures are created varies with the prediction mode. As shown in FIG. 3, the intra 4×4 prediction is provided with nine prediction modes: prediction mode 0 to prediction mode 8. A method for creating reference pictures in each prediction mode is shown in FIG. 4. For example, in prediction mode 0, reference pictures are generated from pixels A to D vertically adjacent to one another. Regarding pixels a to p in the 4×4 block to be encoded, pixel A provides a reference picture for pixels a, e, i, and m in the first column and pixel B provides a reference picture for pixels b, f, j, and n in the second column. Similarly, pixel C provides a reference picture for pixels c, g, k, and o in the third column and pixel D provides a reference picture for pixels d, h, l, and p in the fourth column.

Prediction mode 2 is DC prediction mode, in which pixels shown in Eq. (2) provide references picture for all pixels a to p.

$$(A+B+C+D+I+J+K+L+4) >> 3 \quad (2)$$

Subtraction is performed between the reference picture thus generated in each prediction mode and the current picture, and consequently differential data is generated. Using the differential data, the cost function Eq. (1) is calculated (in the case of intra-prediction mode, Mvcost is a cost equivalent to a code amount of the prediction mode), and a prediction mode with the smallest cost value is selected for use in encoding. The differential data between the reference picture and the current picture in the selected prediction mode is subjected to orthogonal transform, quantization, and variable-length coding processes to perform encoding in inter prediction mode.

A selection between inter-prediction mode and intra-prediction mode in inter slices is made by comparison between the cost value at motion vector position and the cost value of optimum inter-prediction mode. Since a smaller cost value leads to higher coding efficiency and generally higher picture quality, conceivably there is a method that selects the prediction mode with a smaller cost value. The method is advantageous in terms of the coding efficiency of the macroblock, but presents problems described below. First, the inter-prediction mode and intra-prediction mode differ in the method for generating reference pictures. Thus, when inter-prediction mode and intra-prediction mode coexist in an aggregate area, such as a surface of a grass field or athletic field, made up of a collection of mostly flat macroblocks, visual degradation varies between the two modes even if the two modes have comparable cost values. That is, the degradation appears more conspicuous in the intra-prediction mode. Therefore, in an aggregate area, such as a surface of a field, made up of a collection of mostly flat macroblocks, degradation is particularly conspicuous in macroblocks encoded in intra-prediction mode, resulting in loss of picture quality.

To solve this problem, a conventional technique uses a determination formula, which makes intra-prediction mode harder to be selected in a flat part such as a field surface where activity that represents flatness of each macroblock is lower (see Japanese Patent Laid-Open No. 2006-094081).

The picture to be encoded may contain not only a flat aggregate area made up of a collection of mostly flat macroblocks, but also an area in which macroblocks with a large number of high-frequency components and other macroblocks coexist. In encoding low-flatness macroblocks containing high-frequency components and existing in the latter area, even if the intra-prediction mode is selected, visual degradation is not particularly noticeable. However, since the proposed technique described above only considers flatness on a macroblock by macroblock basis, the intra-prediction mode is less likely to be selected. Consequently, compared to a method which simply selects inter-prediction mode or intra-prediction mode whichever has a smaller cost value, the proposed technique has a problem in that it provides a low coding efficiency, resulting in loss of picture quality.

SUMMARY OF THE INVENTION

The present invention provides good pictures both in the case where macroblocks belong to a flat aggregate area and in the opposite case.

One aspect of embodiments of the present invention relates to an image coding apparatus which divides an input picture into a plurality of macroblocks and performs an encoding process by selecting one of an inter-prediction mode and an intra-prediction mode for each macroblock, comprising a flatness determination unit adapted to calculate flatness based on pixel values contained in a macroblock of interest and determine whether the macroblock of interest is a flat macroblock, a storage unit adapted to store determination results by the flatness determination unit for each macroblock, an area determination unit adapted to determine, based on the determination results stored in the storage unit, whether the macroblock of interest determined to be a flat macroblock by the flatness determination unit belongs to an area made up of a collection of mostly flat macroblocks, a prediction mode selection unit adapted to select one of the inter-prediction mode and the intra-prediction mode as a prediction mode for an encoding process of the macroblock of interest based on determination results by the area determination unit and on cost values of the inter-prediction mode and the intra-prediction mode, the cost values having been calculated using a cost function which represents coding efficiency, and a coding unit adapted to perform predictive coding according to the prediction mode selected by the prediction mode selection unit.

Further features of the present invention will become apparent from the following description of exemplary embodiments (with reference to the attached drawings).

BRIEF DESCRIPTION OF THE DRAWINGS

FIG. 2 is an explanatory diagram illustrating pixels used as reference pictures in intra-prediction mode;

FIG. 3 is an explanatory diagram illustrating prediction modes for intra 4×4 prediction;

FIG. 4 is an explanatory diagram illustrating a method for creating reference pictures in intra-prediction mode;

FIG. 7 is a diagram showing a result of determination as to whether a macroblock belongs to a flat aggregate area;

DESCRIPTION OF THE EMBODIMENTS

Preferred embodiments of the present invention will be described below with reference to the drawings.

[First Embodiment]

Figure 1:
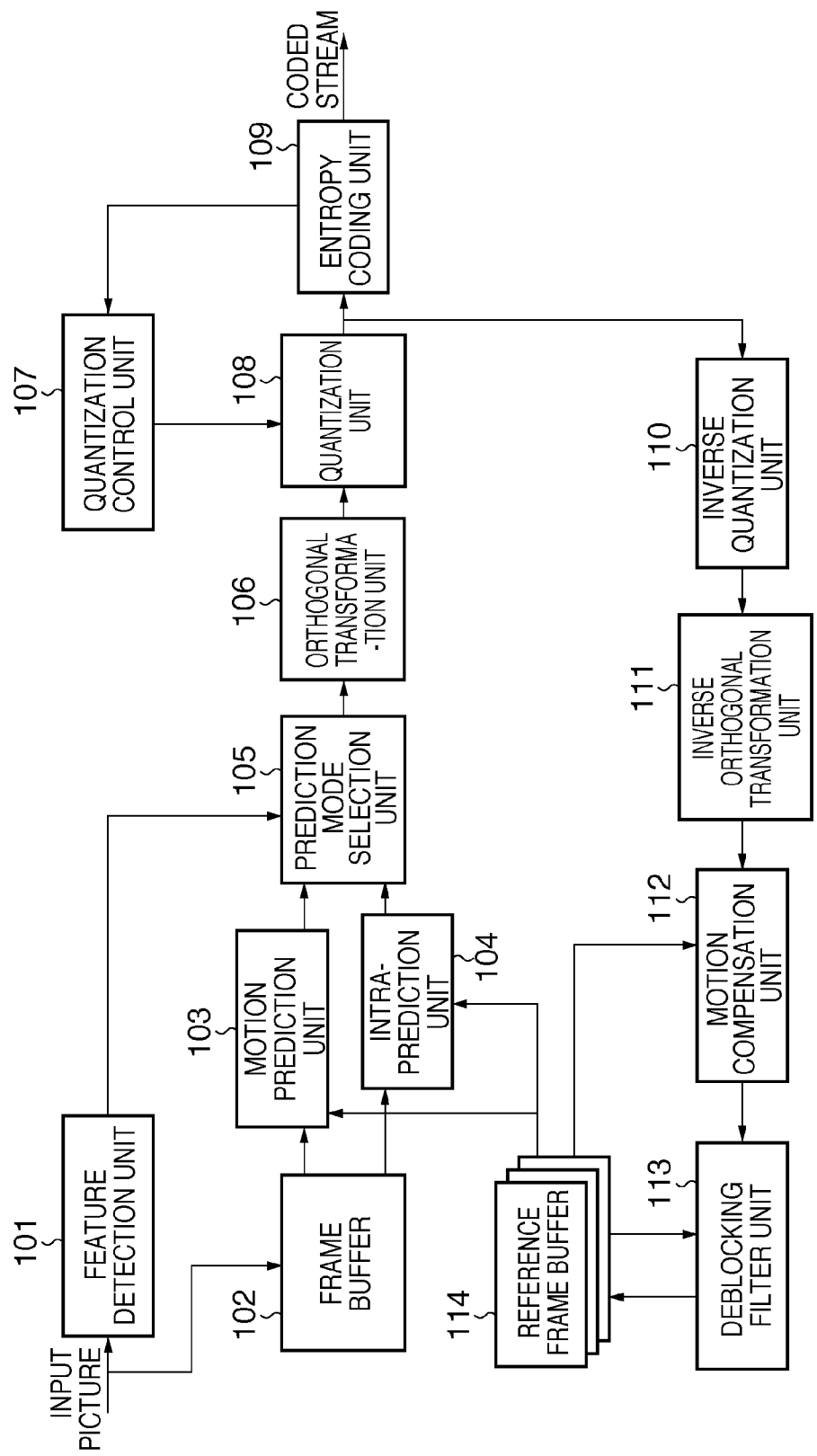
FIG. 1 is a block diagram showing a configuration example of an image coding apparatus according to a first embodiment of the present invention.

FIG. 1 is a block diagram illustrating a configuration of an image coding apparatus according to the present embodiment. A feature detection unit 101 accepts input of a picture to be subjected to an encoding process and determines which part is a flat aggregate area in the inputted picture. Determination results produced here are outputted to a prediction mode selection unit 105 as flat aggregate area flags which indicate whether each macroblock belongs to a flat aggregate area.

Figure 5A:
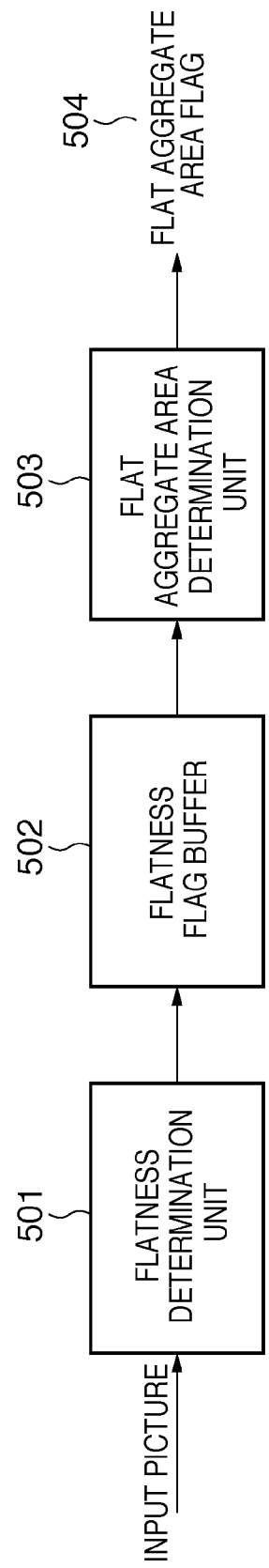
FIG. 5A is a diagram showing an exemplary functional configuration of a feature detection unit 101.
Figure 5B:
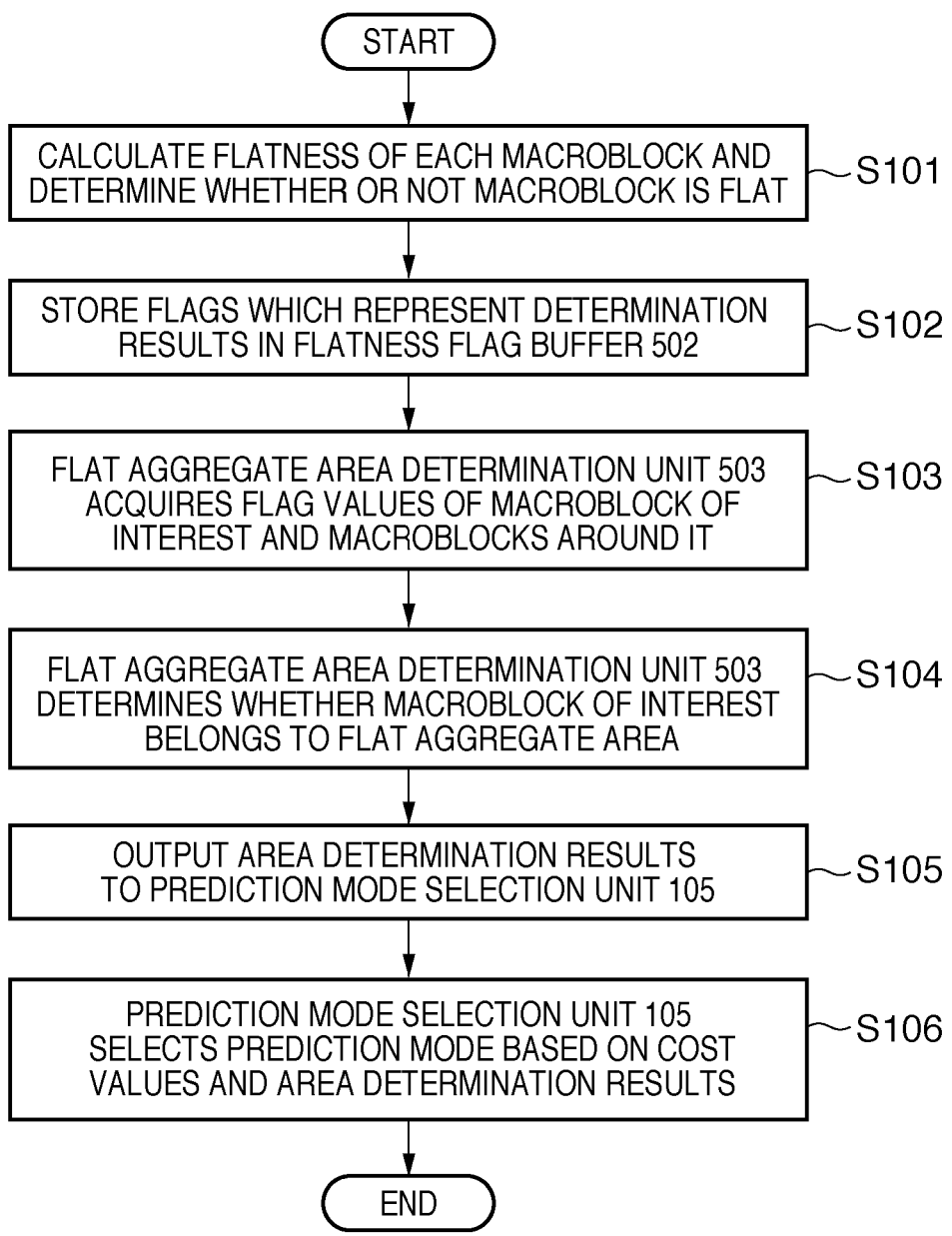
FIG. 5B is a flowchart showing an example of a prediction mode selection process according to embodiments of the present invention.

FIG. 5A shows an exemplary internal configuration of a feature detection unit 101. FIG. 5B shows a flowchart of procedures carried out by the feature detection unit 101 and prediction mode selection unit 105 to select a prediction mode. First, in S101, a flatness determination unit 501 receives an input picture and determines whether or not each macroblock (for example, 16 pixels×16 pixels) is flat. There are a few possible methods for flatness determination. For example, by calculating variance of pixel values in each macroblock as a value which represents flatness, a macroblock whose variance is lower than a predetermined threshold can be determined to be flat. In S102, a flatness flag buffer 502 receives determination results from the flatness determination unit 501 and stores flags which indicate on a macroblock by macroblock basis whether or not the macroblocks are flat. As an example, according to the present embodiment, the flag value is set to "1" when the macroblock is flat, and to "0" when the macroblock is not flat. The flatness flag buffer 502 can store one screen of flatness flags and operates such that flatness determination for the entire screen will be completed before a flat aggregate area determination unit 503 in the subsequent stage comes into operation.

Figure 6A:
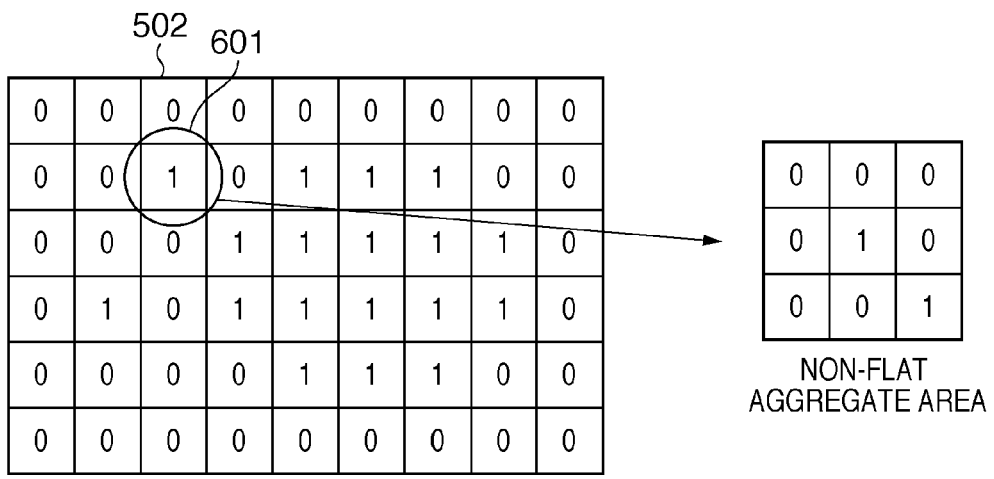
FIGS. 6A and 6B are explanatory diagrams illustrating a method for determining whether or not a macroblock belongs to a flat aggregate area.
Figure 6B:
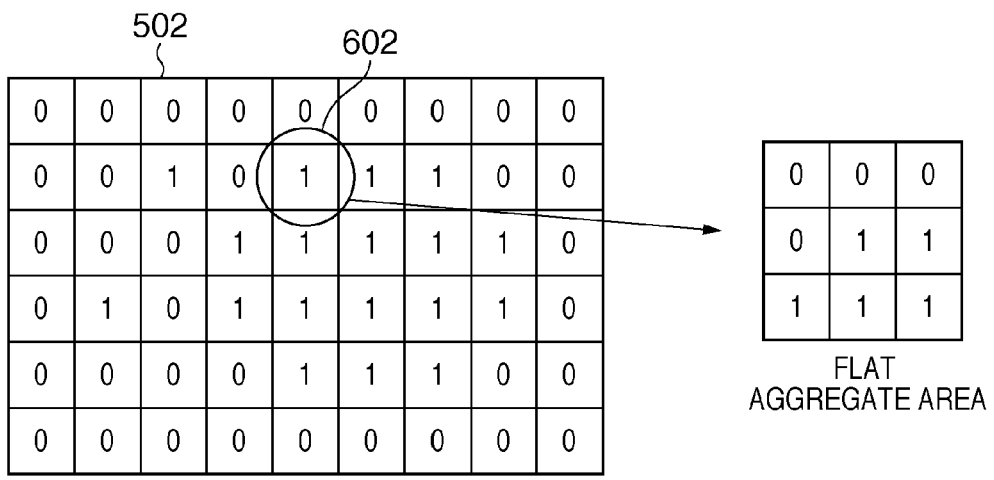

In S103 and S104, the flat aggregate area determination unit 503 determines whether each macroblock belongs to a flat aggregate area, based on the flatness flags stored in the flatness flag buffer 502. An example of a determination method is shown in FIGS. 6A and 6B. The macroblocks determined to be flat are represented by "1," and the macroblocks determined to be not flat are represented by "0." In S103, the flat aggregate area determination unit 503 acquires flag values of a macroblock of interest and macroblocks around the macroblock of interest from the flatness flag buffer 502 and uses the flag values for determination. In S104, if the macroblock of interest is flat and N or more of eight macroblocks around it are determined to be flat, the flat aggregate area determination unit 503 determines that the macroblock of interest belongs to a flat aggregate area. For example, the value of N may be 4, but this is illustrative only, and N may be less than or more than 4.

In FIG. 6A, a macroblock of interest enclosed in a circle 601 is flat, but only one macroblock around it is determined to be flat. In this case, the macroblock of interest is determined as not belonging to a flat aggregate area. On the other hand, in FIG. 6B, a macroblock of interest 602 is flat and four macroblocks around it are determined to be flat. In this case, the macroblock of interest is determined as belonging to a flat aggregate area. In this way, the flat aggregate area determination unit 503 determines whether a macroblock belongs to a flat aggregate area and outputs a determination result to the prediction mode selection unit 105. The determination result can be expressed as one of two values. According to the present embodiment, a macroblock belonging to a flat aggregate area can be expressed as "1" and a macroblock not belonging to a flat aggregate area can be expressed as "0."

Results obtained by making a determination on each macroblock in the manner described above are shown in FIG. 7. Determination results 700 show one screen of flat flags in the flatness flag buffer 502. A hatched cell 701 represents a macroblock determined as being flat, but as not belonging to a flat aggregate area. On the other hand, macroblocks in a region 702 surrounded by thick lines are determined as forming a flat aggregate area. Determination results 710 show an example of flat aggregate area flags 504, where a hatched cell 701 contains a flag value of "0." This indicates that the macroblock does not belong to a flat aggregate area. On the other hand, all flag values in a region 702 surrounded by thick lines are "1," indicating that the macroblocks belong to a flat aggregate area. Incidentally, the configuration of the feature detection unit 101 is not limited to the one shown in FIG. 5A, and any configuration may be used as long as flat aggregate areas can be detected.

For each macroblock of interest to be encoded, the flat aggregate area flag generated as an area determination result in the manner described above is outputted from the flat aggregate area determination unit 503 to the prediction mode selection unit 105 in S105. In S106, the prediction mode selection unit 105 selects a prediction mode for predictive coding using the flat aggregate area flags acquired and cost values acquired from a motion prediction unit 103 and intra-prediction unit 104. A prediction mode selection process in S106 will be described in detail below.

Returning to description of the block diagram in FIG. 1, a frame buffer 102, which stores input pictures to be encoded, outputs a target picture to the motion prediction unit 103 and intra-prediction unit 104. The motion prediction unit 103 performs block matching between the target picture received from the frame buffer 102 and reference pictures received from a reference frame buffer 114 and calculates a motion vector at a position with the smallest cost value using a cost function which represents coding efficiency. The motion prediction unit 103 outputs a motion prediction result and the cost value to the prediction mode selection unit 105, where the motion prediction result is provided in the form of differential data on the difference between the reference picture at the motion vector position and the target picture.

The intra-prediction unit 104 performs intra-prediction using the target picture read from the frame buffer 102 and reference pictures read from the reference frame buffer 114. From among prediction modes, the intra-prediction unit 104 selects the prediction mode with the smallest cost value using the cost function which represents coding efficiency. The intra-prediction unit 104 outputs an intra-prediction result and the cost value to the prediction mode selection unit 105, where the intra-prediction result is provided in the form of differential data on the difference between the reference picture in the selected prediction mode and the target picture.

The prediction mode selection unit 105 acquires, from the feature detection unit 101, a flag value which indicates whether the macroblock of interest to be encoded belongs to a flat aggregate area. The feature detection unit 101 outputs a flat aggregate area flag 504 in relation to each macroblock of interest to be processed. When the flag value indicates that the macroblock belongs to a flat aggregate area, since degradation appears more conspicuous in intra-prediction mode than in inter-prediction mode, if the two modes have comparable cost values, measures are taken so that the inter-prediction mode will be adopted preferentially. Specifically, an intra/inter determination formula given by Eq. (3) is used so that the intra-prediction mode will not be entered unless the inter-prediction mode is larger in cost value than the intra-prediction mode to some extent.

If InterCOST>IntraCOST+$\alpha$, then select intra-prediction

If InterCOST<=IntraCOST+$\alpha$, then select inter-prediction (3)

where InterCOST is the cost value of inter-prediction mode received from the motion prediction unit 103, IntraCOST is the cost value of intra-prediction mode received from the intra-prediction unit 104, and $\alpha$ is a correction value of the cost value of intra-prediction mode and is a constant which can be set arbitrarily.

When the flag indicates that the macroblock does not belong to a flat aggregate area, since the prediction mode with a smaller cost value gives higher coding efficiency and better picture quality, an intra/inter determination formula given by Eq. (4) is used.

If InterCOST>IntraCOST, then select intra-prediction

If InterCOST<=IntraCOST, then select inter-prediction (4)

Based on the intra/inter determination formulae, the prediction mode selection unit 105 determines which of the intra-prediction mode and inter-prediction mode should be selected. Consequently, in an aggregate area of flat macroblocks, the intra-prediction mode has a far smaller cost value than does the inter-prediction mode, meaning that macroblocks with less picture quality degradation are encoded in the intra-prediction mode. This makes it possible to reduce picture quality degradation in situations where inter-prediction mode and intra-prediction mode coexist. On the other hand, in an area other than an aggregate area of flat macroblocks, by selecting the prediction mode with a smaller cost value, it is possible to obtain good picture quality without impairing the coding efficiency.

The prediction mode selection unit 105 sends differential data, which is a prediction result in the prediction mode thus determined, to an orthogonal transformation unit 106. The orthogonal transformation unit 106 performs a discrete cosine transform on the differential data and sends a resulting transform coefficient to a quantization unit 108. The quantization unit 108 quantizes the received transform coefficient according to a quantization step size outputted by a quantization control unit 107. The quantized transform coefficient is sent to an entropy coding unit 109 and a inverse-quantization unit 110 which creates a locally decoded picture. The entropy coding unit 109 performs variable-length coding of the quantized transform coefficient by zigzag scanning, alternate scanning, or the like. Then, coding method information, including motion vector, quantization step size, and macroblock splitting information, is added in the form of variable-length codes to generate a coded stream. Also, the entropy coding unit 109 calculates a generated code amount of each macroblock during encoding and sends the code amounts to the quantization control unit 107. Based on the generated code amount received from the entropy coding unit 109, the quantization control unit 107 determines the quantization step size which will provide a desired code amount and outputs the quantization step size to the quantization unit 108.

The inverse-quantization unit 110 inverse-quantizes the quantized transform coefficient received as input and thereby generates a transform coefficient for local decoding. The transform coefficient is outputted to an inverse orthogonal transformation unit 111. The inverse orthogonal transformation unit 111 performs an inverse discrete cosine transform on the inputted transform coefficient and thereby generates a differential picture. The differential picture is outputted to a motion compensation unit 112. The motion compensation unit 112 reads the reference picture at motion vector position out of the reference frame buffer 114, adds the inputted differential picture thereto, and thereby creates picture data for local decoding. The created picture data is outputted to a deblocking filter unit 113. The deblocking filter unit 113 stores the inputted picture once in the reference frame buffer 114 before applying a deblocking filter to the inputted picture.

This is because intra-prediction requires reference pictures yet to go through deblocking filtering. Subsequently, the deblocking filter unit 113 applies deblocking filtering to the reference pictures and stores the filtered pictures as locally decoded pictures in the reference frame buffer 114. A coded stream and locally decoded pictures are created through this operation.

Incidentally, although in the above embodiment, the cost value of intra-prediction mode is corrected by addition of an arbitrary constant α, the correction method is not limited to the addition of a predetermined value, and subtraction, multiplication, or division may be used alternatively. For example, the constant α may be subtracted from the cost value of inter-prediction mode. Alternatively, the cost value of intra-prediction mode may be multiplied by an arbitrary constant α' or the cost value of inter-prediction mode may be divided by an arbitrary constant α". Any other correction method may be used as long as the inter-prediction mode is adopted preferentially over the intra-prediction mode when the two modes have much the same cost values before correction. The correction is made such that the ratio (IntraCOST/InterCOST) of the cost value in the intra-prediction mode to the cost value in the inter-prediction mode will increase.

As described above, according to the present embodiment, it is determined whether each macroblock in an input picture belongs to a flat aggregate area. The results of determination are used in selecting coding mode for each macroblock between inter-prediction mode and intra-prediction mode. Specifically, when a macroblock belongs to a flat aggregate area, the cost values are corrected such that the inter-prediction mode is more likely to be selected, and the corrected cost values are compared. Consequently, macroblocks with less picture quality degradation are selected for encoding in intra-prediction mode. On the other hand, when a macroblock does not belong to a flat aggregate area, a prediction mode is selected through simple comparison of cost values without correction to the cost values. This makes it possible to obtain a good picture regardless of whether macroblocks belong to a flat aggregate area.

[Second Embodiment]

Figure 8:
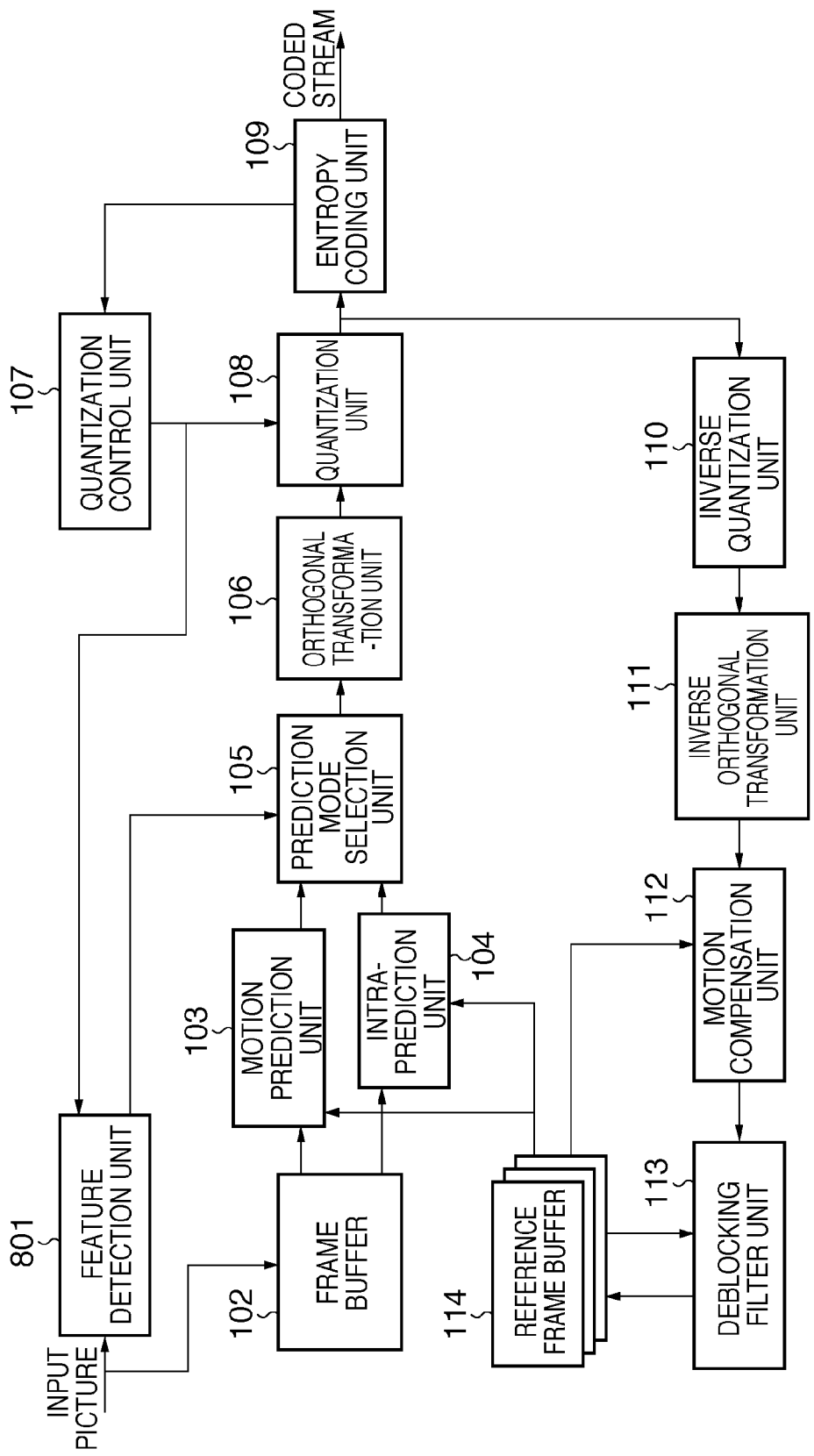
FIG. 8 is a block diagram showing a configuration example of an image coding apparatus according to a second embodiment of the present invention.

FIG. 8 is a block diagram illustrating a configuration of an image coding apparatus according to a second embodiment of the present invention. Only differences from the first embodiment will be described in detail here. The second embodiment differs from the first embodiment in that a feature detection unit 801 operates differently from the feature detection unit 101 and that the quantization control unit 107 informs the feature detection unit 801 of quantization step size. First, if the quantization step size is larger than a determination threshold, the feature detection unit 801 determines whether the aggregate area is a flat aggregate area. This is because when the quantization step size is small, degradation is not great enough to be noticeable even if inter-prediction mode and intra-prediction mode coexist in a flat aggregate area.

Figure 9:
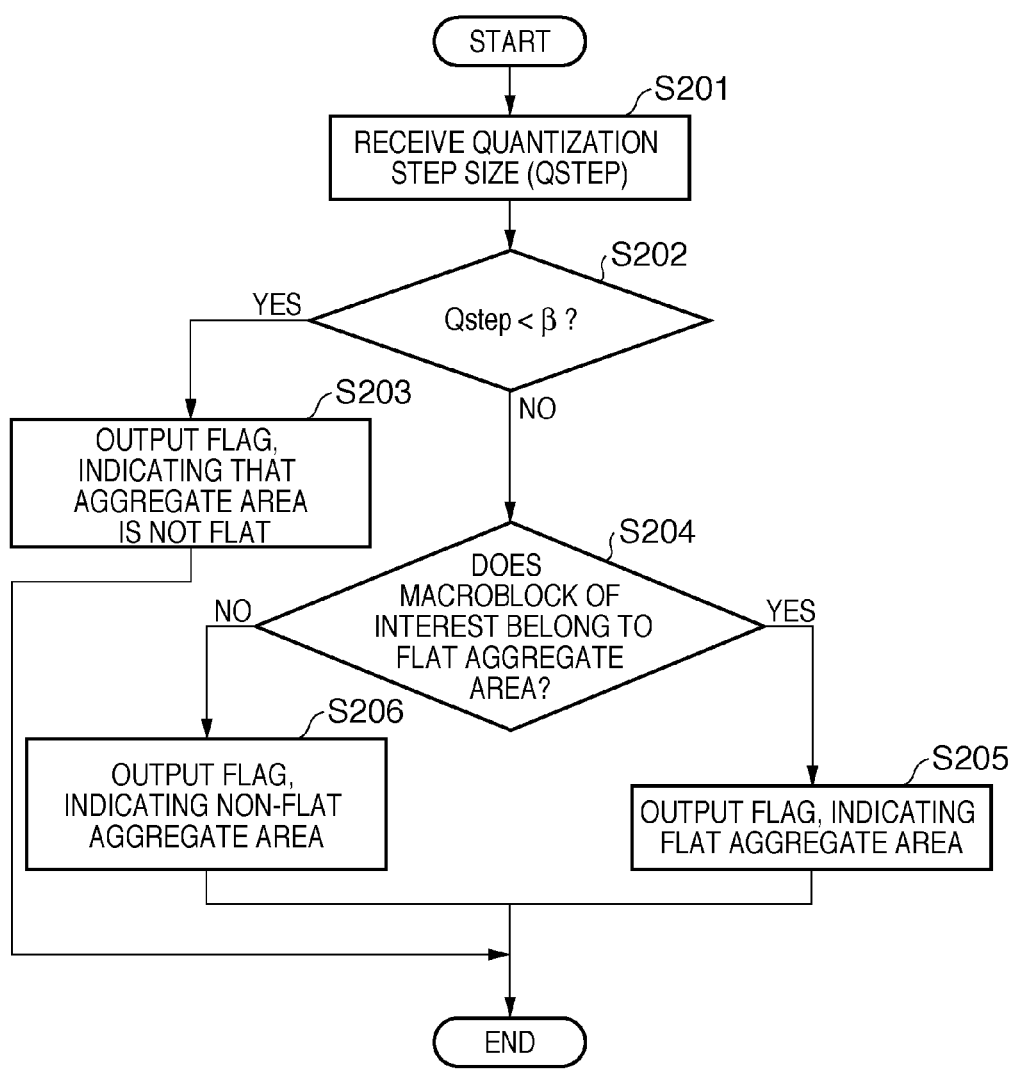
FIG. 9 is a flowchart showing operation of a feature detection unit 801.

FIG. 9 is a flowchart showing operation of the feature detection unit 801 according to the present embodiment. First, in S201, the feature detection unit 801 acquires the quantization step size (Qstep) of the macroblock of interest to be processed, from the quantization control unit 107. The quantization step size threshold below which there is no need for determination as to a flat aggregate area is denoted by β. In S202, the feature detection unit 801 determines whether the quantization step size (Qstep) is smaller than the threshold β. If the quantization step size (Qstep) is smaller than the threshold β, the feature detection unit 801 goes to S203. In S203, without making a determination as to a flat aggregate area, the feature detection unit 801 outputs a flag to the prediction mode selection unit 105, indicating that the aggregate area is not a flat aggregate area. On the other hand, if the quantization step size (Qstep) is equal to or larger than the threshold β, the feature detection unit 801 goes to S204. In S204, the feature detection unit 801 determines whether the macroblock of interest belongs to a flat aggregate area. If the macroblock of interest belongs to a flat aggregate area (YES in S204), the feature detection unit 801 outputs a flag value of "1" in S205, indicating a flat aggregate area. On the other hand, if the macroblock of interest does not belong to a flat aggregate area (NO in S204), the feature detection unit 801 outputs a flag value of "0" in S206, indicating a non-flat aggregate area.

The prediction mode selection unit 105 acquires, from the feature detection unit 801, a flag value which indicates whether the macroblock of interest to be encoded belongs to a flat aggregate area. The process of the prediction mode selection unit 105 is the same as in the first embodiment, and thus description thereof will be omitted in the present embodiment.

As described above, according to the present embodiment, a determination as to a flat aggregate area is made only when the quantization step size is equal to or larger than a predetermined value. If it is determined that the macroblock belongs to a flat aggregate area, a prediction mode is selected and only macroblocks with less picture quality degradation are selected for encoding in the intra-prediction mode, as in the case of the first embodiment. On the other hand, when the quantization step size is smaller than the predetermined value or when the macroblock does not belong to a flat aggregate area, a prediction mode is selected by taking only cost values into consideration. This makes it possible to obtain a good picture regardless of whether macroblocks belong to a flat aggregate area.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157317, filed Jul. 1, 2009, which is hereby incorporated by reference herein in its entirety.

What is claimed is:

1. An image coding apparatus which divides an input picture into a plurality of blocks and performs an encoding process by selecting one of an inter-prediction mode and an intra-prediction mode for each block, comprising:
    a flatness determination unit adapted to calculate flatness based on pixel values contained in a block of interest and determine whether the block of interest is a flat block;
    a storage unit adapted to store determination results by said flatness determination unit for each block;

an area determination unit adapted to determine, based on the determination results stored in said storage unit, whether the block of interest determined to be a flat block by said flatness determination unit belongs to an area made up of a collection of predetermined quantity of the flat blocks;

a prediction mode selection unit adapted to select one of the inter-prediction mode and the intra-prediction mode as a prediction mode for an encoding process of the block of interest based on determination results by said area determination unit and on cost values of the inter-prediction mode and the intra-prediction mode, the cost values having been calculated using a cost function which represents coding efficiency; and a coding unit adapted to perform predictive coding according to the prediction mode selected by said prediction mode selection unit, wherein said prediction mode selection unit is further adapted to:

calculate the cost value for each of the inter-prediction mode and the intra-prediction mode based on a difference between a reference picture and the input picture, wherein the reference picture is referred to in the encoding process; and correct the calculated cost values, in the case of the block of interest belonging to the area, a ratio of the cost value of the intra-prediction mode to the cost value of the inter-prediction mode increases and select one of the prediction modes by comparing the corrected cost values.

2. The image coding apparatus according to claim 1, wherein said area determination unit further adapted to determine whether the block of interest belongs to the area based on the number of blocks determined to be flat blocks by said flatness determination unit out of blocks around the block of interest determined to be a flat block by said flatness determination unit.

3. The image coding apparatus according to claim 1, wherein said coding unit comprises:

a motion prediction unit adapted to perform motion prediction using the block of interest and the reference picture;

an intra-prediction unit adapted to perform prediction using the block of interest and pixels around the block of interest;

an orthogonal transformation unit adapted to perform an orthogonal transform on a prediction result by said motion prediction unit when the inter-prediction mode is selected by said prediction mode selection unit and to perform an orthogonal transform on a prediction result by said intra-prediction unit when the intra-prediction mode is selected;

a quantization unit adapted to quantize a transform coefficient obtained as a result of the orthogonal transform performed by said orthogonal transformation unit, based on a quantization step size; and an entropy coding unit adapted to entropy-encode the transform coefficient quantized by said quantization unit, wherein said area determination unit further adapted to determine whether the block of interest belongs to the area only when the quantization step size of the block of interest used by said quantization unit is equal to or larger than a predetermined value, and to determine that the block of interest does not belong to the area when the quantization step size is smaller than the predetermined value.

4. The image coding apparatus according to claim 1, wherein the correction is made by adding a predetermined value to the cost value of the intra-prediction mode, by multiplying the cost value of the intra-prediction mode by the predetermined value, or by dividing the cost value of the inter-prediction mode by the predetermined value.

5. The image coding apparatus according to claim 1, wherein said flatness determination unit further adapted to calculate the flatness based on variance of pixel values in each of the blocks.

6. A control method for an image coding apparatus which divides an input picture into a plurality of blocks and performs an encoding process by selecting one of an inter-prediction mode and an intra-prediction mode for each block, the control method comprising:

a flatness determination step of calculating flatness based on pixel values contained in a block of interest and determining whether the block of interest is a flat block;

a storage step of storing determination results in said flatness determination step for each block;

an area determination step of determining, based on the determination results stored in said storage step, whether the block of interest determined to be a flat block by said flatness determination step belongs to an area made up of a collection of predetermined quantity of the flat blocks;

a prediction mode selection step of selecting one of the inter-prediction mode and the intra-prediction mode as a prediction mode for an encoding process of the block of interest based on determination results in said area determination step and on cost values of the inter-prediction mode and the intra-prediction mode, the cost values having been calculated using a cost function which represents coding efficiency; and a coding step of performing predictive coding according to the prediction mode selected by said prediction mode selection step, wherein said prediction mode selection step includes steps of:

calculating the cost value for each of the inter-prediction mode and the intra-prediction mode based on a difference between a reference picture and the input picture, wherein the reference picture is referred to in the encoding process; and correcting the calculated cost values, in the case of the block of interest belonging to the area, a ratio of the cost value of the intra-prediction mode to the cost value of the inter-prediction mode increases and select one of the prediction modes by comparing the corrected cost values.

7. A computer readable non-transitory storage medium which stores a computer program causing a computer to function as an image coding apparatus which divides an input picture into a plurality of blocks and performs an encoding process by selecting one of an inter-prediction mode and an intra-prediction mode for each block, the apparatus comprising:

a flatness determination unit adapted to calculate flatness based on pixel values contained in a block of interest and determine whether the block of interest is a flat block;

a storage unit adapted to store determination results by said flatness determination unit for each block;

an area determination unit adapted to determine, based on the determination results stored in said storage unit, whether the block of interest determined to be a flat block by said flatness determination unit belongs to an area made up of a collection of predetermined quantity of the flat blocks;

a prediction mode selection unit adapted to select one of the inter-prediction mode and the intra-prediction mode as a prediction mode for an encoding process of the block of interest based on determination results by said area determination unit and on cost values of the inter-prediction mode and the intra-prediction mode, the cost values having been calculated using a cost function which represents coding efficiency; and a coding unit adapted to perform predictive coding according to the prediction mode selected by said prediction mode selection unit, wherein said prediction mode selection step includes steps of:

calculating the cost value for each of the inter-prediction mode and the intra-prediction mode based on a difference between a reference picture and the input picture, wherein the reference picture is referred to in the encoding process; and correcting the calculated cost values, in the case of the block of interest belonging to the area, a ratio of the cost value of the intra-prediction mode to the cost value of the inter-prediction mode increases and select one of the prediction modes by comparing the corrected cost values.

8. An image coding apparatus comprising:

a coding unit that encodes an input picture, wherein the coding unit divides the input picture into a plurality of blocks and performs an encoding process by selecting an inter-prediction mode or an intra-prediction mode for each block;

a determination unit that determines whether a coding target block is a flatblock, based on pixel values of the coding target block;

a cost value calculation unit that calculates a cost value for each of the inter-prediction mode and the intra-prediction mode based on a difference between a reference picture and the input picture, wherein the reference picture is referred to in the encoding process; and a correction unit that corrects the calculated cost values, in the case where the coding target block is the flat block, such that a ratio of the cost value of the intra-prediction mode to the cost value of the inter-prediction mode increases, wherein the coding unit selects the inter-prediction mode or the intra-prediction mode for an encoding process of the coding target block, based on the corrected cost value such that the inter-prediction mode is selected preferentially.

9. The image coding apparatus according to claim 8, wherein the determination unit determines whether the coding target block is the flat block, based on a variance of pixel values of the coding target block and a variance of pixel values of the at least one of blocks around the coding target block.

10. The image coding apparatus according to claim 8, wherein the determination unit determines whether the block of interest is the flat block for each block.

11. A control method for an image coding apparatus, the control method comprising:

a coding step of encoding an input picture by dividing the input picture into a plurality of blocks and performing an encoding process by selecting an inter-prediction mode or an intra-prediction mode for each block;

a determination step of determining whether a coding target block is a flat block, based on pixel values of the coding target block;

a cost value calculation step of calculating a cost value for each of the inter-prediction mode and the intra-prediction mode based on a difference between a reference picture and the input picture, wherein the reference picture is referred to in the encoding process; and a correction step of correcting the calculated cost values, in the case where the coding target block is the flat block, such that a ratio of the cost value of the intra-prediction mode to the cost value of the inter-prediction mode increases, wherein in the coding step, the inter-prediction mode or the intra-prediction mode for an encoding process of the coding target block, based on the corrected cost value such that the inter-prediction mode is selected preferentially.

12. A computer readable non-transitory storage medium which stores a computer program causing a computer to function as an image coding apparatus, the apparatus comprising:

a coding unit that encodes an input picture, wherein the coding unit divides the input picture into a plurality of blocks and performs an encoding process by selecting an inter-prediction mode or an intra-prediction mode for each block;

a determination unit that determines whether a coding target block is a flat block, based on pixel values of the coding target block and pixel values of at least one of blocks around the coding target block;

a cost value calculation unit that calculates a cost value for each of the inter-prediction mode and the intra-prediction mode based on a difference between a reference picture and the input picture, wherein the reference picture is referred to in the encoding process; and a correction unit that corrects the calculated cost values, in the case where the coding target block is the flat block, such that a ratio of the cost value of the intra-prediction mode to the cost value of the inter-prediction mode increases, wherein the coding unit selects the inter-prediction mode or the intra-prediction mode for an encoding process of the coding target block, based on the corrected cost value such that the inter-prediction mode is selected preferentially.

13. The image coding apparatus according to claim 8, wherein the blocks include at least upper block of the coding target block.

14. The image coding apparatus according to claim 8, wherein the blocks include at least left block of the coding target block.

15. The image coding apparatus according to claim 8, wherein the blocks include at least under block of the coding target block.

16. The control method according to claim 11, wherein the blocks include at least upper block of the coding target block.

17. The control method according to claim 11, wherein the blocks include at least left block of the coding target block.

18. The control method according to claim 11, wherein the blocks include at least under block of the coding target block.

19. The computer readable non-transitory storage medium according to claim 12, wherein the blocks include at least upper block of the coding target block.

20. The computer readable non-transitory storage medium according to claim 12,
wherein the blocks include at least left block of the coding target block.

21. The computer readable non-transitory storage medium according to claim 12,
wherein the blocks include at least under block of the coding target block.

* * * * *